United States Patent
Kim et al.

(10) Patent No.: US 9,881,733 B2
(45) Date of Patent: Jan. 30, 2018

(54) APPARATUS AND METHOD FOR TRANSMITTING AND RECEIVING WIRELESS POWER

(71) Applicant: SAMSUNG ELECTRONICS CO., LTD., Suwon-si (KR)

(72) Inventors: Nam Yun Kim, Seoul (KR); Sang Wook Kwon, Seongnam-si (KR); Ki Young Kim, Yongin-si (KR); Yun Kwon Park, Dongducheon-si (KR); Chang Wook Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 14/019,306

(22) Filed: Sep. 5, 2013

(65) Prior Publication Data

US 2014/0070624 A1 Mar. 13, 2014

(30) Foreign Application Priority Data

Sep. 7, 2012 (KR) .................. 10-2012-0099114

(51) Int. Cl.
*H01F 27/42* (2006.01)
*H01F 37/00* (2006.01)
(Continued)

(52) U.S. Cl.
CPC ............ *H01F 38/14* (2013.01); *B60L 11/182* (2013.01); *B60L 11/1833* (2013.01); *B60L 11/1842* (2013.01); *B60L 11/1846* (2013.01); *H02J 5/005* (2013.01); *H02J 7/00* (2013.01); *H02J 7/0054* (2013.01); *H02J 7/025* (2013.01); *B60L 2210/10* (2013.01); *B60L 2210/30* (2013.01);
(Continued)

(58) Field of Classification Search
CPC ... H02J 7/00; H02J 7/025; H02J 7/007; B60L 11/182; B60L 11/14; B60L 11/1816; B60L 11/1829
USPC .... 307/104, 149, 66, 116, 64; 320/108, 107, 320/106; 343/853, 851
See application file for complete search history.

(56) References Cited

U.S. PATENT DOCUMENTS 8,487,480 B1 * 7/2013 Kesler .................. B60L 11/007
307/104
2009/0098899 A1 4/2009 Gorokhov et al.
(Continued)

FOREIGN PATENT DOCUMENTS

JP 2009-201344 A 9/2009
JP 2009-261105 A 11/2009
(Continued)

*Primary Examiner* — Fritz M Fleming
*Assistant Examiner* — Jagdeep Dhillon
(74) *Attorney, Agent, or Firm* — NSIP Law

(57) ABSTRACT

An apparatus that transmits and receives wireless power, includes a controller configured to determine whether the apparatus is to operate in a power reception mode or a power transmission mode based on a capacity of a battery of the apparatus, and a capacity of a battery of another apparatus. The apparatus further includes a resonator configured to receive power from the other apparatus in response to the apparatus being determined to operate in the power reception mode, and transmit power to the other apparatus in response to the apparatus being determined to operate in the power transmission mode.

20 Claims, 22 Drawing Sheets

(51) Int. Cl.
*H01F 38/00* (2006.01)
*H01F 38/14* (2006.01)
*H02J 7/00* (2006.01)
*H02J 5/00* (2016.01)
*H02J 7/02* (2016.01)
*B60L 11/18* (2006.01)

(52) U.S. Cl.
CPC ....... *B60L 2210/40* (2013.01); *B60L 2250/12* (2013.01); *B60L 2250/16* (2013.01); *B60L 2250/20* (2013.01); *Y02E 60/721* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2009/0108679 A1* | 4/2009 | Porwal | H02J 17/00 307/104 |
| 2010/0277120 A1 | 11/2010 | Cook et al. | |
| 2011/0119135 A1 | 5/2011 | Grilli et al. | |
| 2011/0127846 A1 | 6/2011 | Urano | |
| 2011/0156640 A1 | 6/2011 | Moshfeghi | |
| 2011/0165907 A1 | 7/2011 | Odigie et al. | |
| 2011/0221390 A1* | 9/2011 | Won | H02J 7/0054 320/108 |
| 2013/0057364 A1* | 3/2013 | Kesler | B60L 11/182 333/219.2 |
| 2013/0342421 A1* | 12/2013 | Katz | H01Q 1/52 343/852 |
| 2014/0065982 A1* | 3/2014 | Suh | H04B 1/006 455/77 |
| 2014/0111147 A1* | 4/2014 | Soar | H01F 27/365 320/108 |

FOREIGN PATENT DOCUMENTS

| | | |
|---|---|---|
| JP | 2010-74992 A | 4/2010 |
| JP | 2010-82653 A | 4/2010 |
| JP | 2010-239548 A | 10/2010 |
| JP | 2012-23950 A | 2/2012 |
| KR | 10-2011-0004326 A | 1/2011 |
| KR | 10-2011-0009227 A | 1/2011 |
| KR | 10-2011-0027591 A | 3/2011 |
| KR | 10-2011-0051272 A | 5/2011 |
| KR | 10-2011-0103297 A | 9/2011 |
| KR | 10-2011-0110987 A | 10/2011 |
| KR | 10-2011-0112435 A | 10/2011 |
| KR | 10-2011-0112917 A | 10/2011 |
| KR | 10-2011-0114703 A | 10/2011 |
| KR | 10-2011-0122728 A | 11/2011 |
| KR | 10-2011-0125755 A | 11/2011 |
| KR | 10-2011-0133111 A | 12/2011 |
| KR | 10-2011-0135540 A | 12/2011 |
| WO | WO 2011/0488777 A1 | 4/2011 |

* cited by examiner

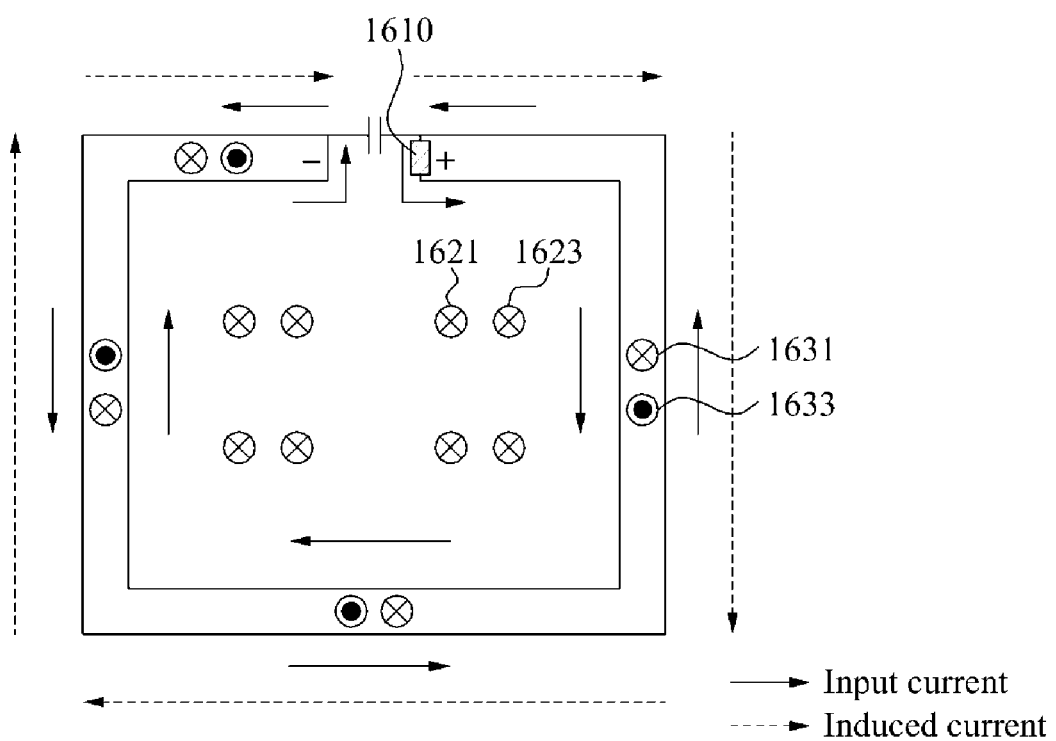

APPARATUS AND METHOD FOR TRANSMITTING AND RECEIVING WIRELESS POWER

CROSS-REFERENCE TO RELATED APPLICATION(S)

This application claims the benefit under 35 USC 119(a) of Korean Patent Application No. 10-2012-0099114, filed on Sep. 7, 2012, in the Korean Intellectual Property Office, the entire disclosure of which is incorporated herein by reference for all purposes.

BACKGROUND

1. Field

The following description relates to an apparatus and a method for transmitting and receiving wireless power.

2. Description of Related Art

Research on wireless power transmission has been conducted to overcome an increase in inconveniences of wired power supplies and the limited capacity of conventional batteries, due to an explosive increase in various electronic devices including mobile devices. Additionally, wireless power transmission may be used in electric vehicles. One of wireless power transmission technologies uses resonance characteristics of radio frequency (RF) devices.

Wireless power refers to energy transferred from a wireless power transmitter to a wireless power receiver through magnetic coupling. Accordingly, a wireless power transmission system includes a source device configured to wirelessly transmit power, and a target device configured to wirelessly receive power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator. Also, the source device and the target device may communicate with each other to transmit and receive control information and state information.

SUMMARY

In one general aspect, there is provided an apparatus that transmits and receives wireless power, the apparatus including a controller configured to determine whether the apparatus is to operate in a power reception mode or a power transmission mode based on a capacity of a battery of the apparatus, and a capacity of a battery of another apparatus. The apparatus further includes a resonator configured to receive power from the other apparatus in response to the apparatus being determined to operate in the power reception mode, and transmit power to the other apparatus in response to the apparatus being determined to operate in the power transmission mode.

In another general aspect, there is provided an apparatus that transmits and receives wireless power, the apparatus including a resonator configured to receive power from another apparatus in a power reception mode, and transmit power to the other apparatus in a power transmission mode. The apparatus further includes a path controller configured to control an electrical pathway of the apparatus based on the power reception and transmission modes. The apparatus further includes a controller configured to provide a user interface associated with wireless power transmission.

In still another general aspect, there is provided a method of transmitting and receiving wireless power in an apparatus that transmits and receives the wireless power, the method including determining whether the apparatus is to operate in a power reception mode or a power transmission mode based on a capacity of a battery of the apparatus, and a capacity of a battery of another apparatus. The method further includes receiving power from the other apparatus in response to the apparatus being determined to operate in the power reception mode, and transmitting power to the other apparatus in response to the apparatus being determined to operate in the power transmission mode.

In yet another general aspect, there is provided a method of transmitting and receiving wireless power in an apparatus that transmits and receives the wireless power, the method including sensing a presence of another apparatus. The method further includes determining whether power transmission is possible based on a distance between the apparatus and the other apparatus, and/or a power transmission efficiency between the apparatus and the other apparatus, and determining whether the apparatus is to operate in a power reception mode or a power transmission mode based on whether the power transmission is determined to be possible. The method further includes receiving power from the other apparatus in response to the apparatus being determined to operate in the power reception mode, and transmitting power to the other apparatus in response to the apparatus being determined to operate in the power transmission mode.

In still another general aspect, there is provided a method of transmitting and receiving wireless power in an apparatus that transmits and receives the wireless power, the method including providing a user interface associated with wireless power transmission, and displaying, through the user interface, wireless charging information used to select a power reception mode or a power transmission mode. The method further includes receiving power from another apparatus in the power reception mode, and transmitting power to the other apparatus in the power transmission mode.

Other features and aspects will be apparent from the following detailed description, the drawings, and the claims.

BRIEF DESCRIPTION OF THE DRAWINGS

FIG. 16A is a diagram illustrating an example of a distribution of a magnetic field in a resonator that is produced by feeding of a feeding unit, of a wireless power transmitter.

DETAILED DESCRIPTION

Figure 1:
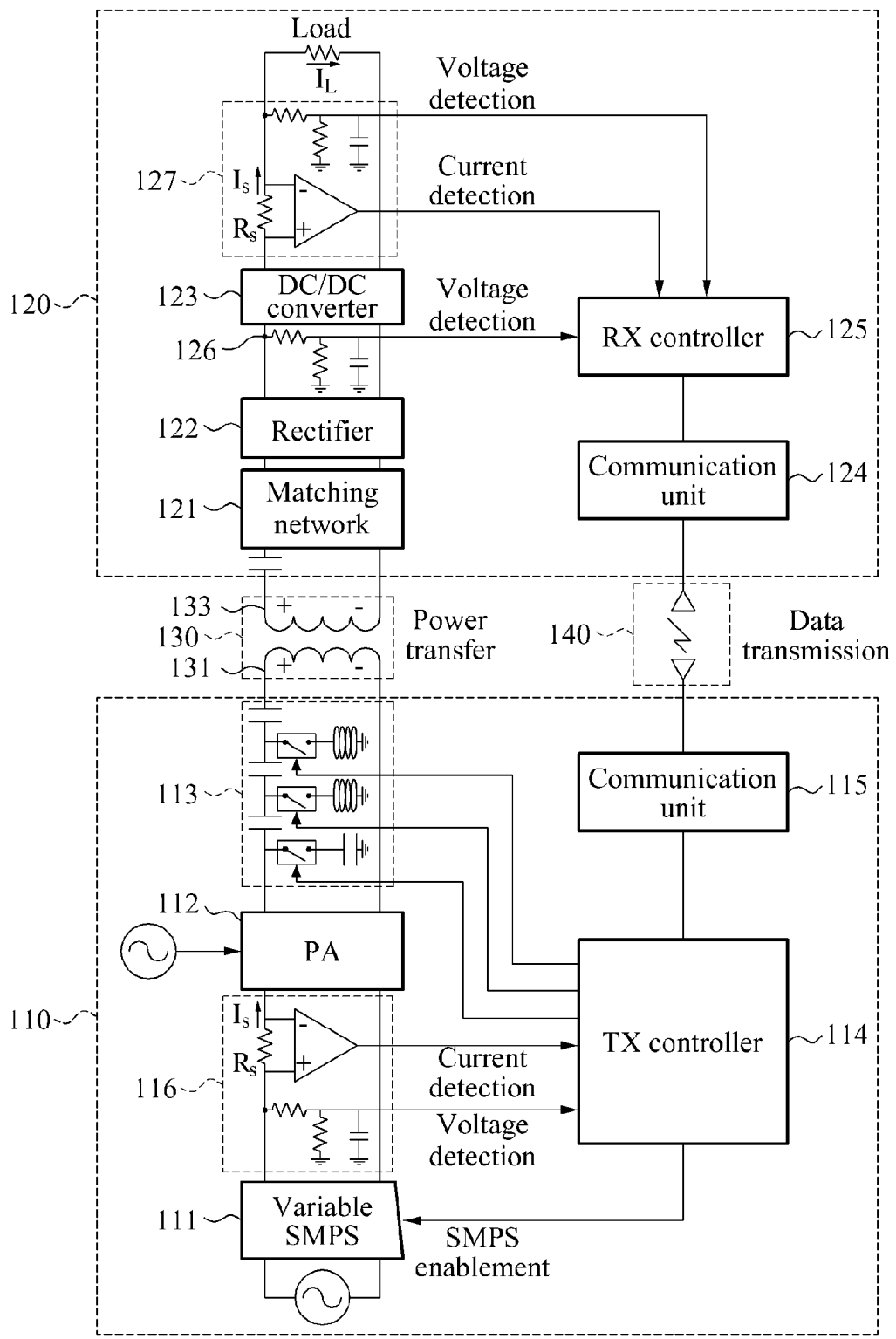
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a wireless power transmission system. Referring to FIG. 1, a wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114 (e.g., a TX control logic), a communication unit 115, a power detector 116, and a source resonator 131. The target device 120 includes a matching network 121, a rectifier 122, a direct current-to-direct current (DC/DC) converter 123, a communication unit 124, a reception (RX) controller 125 (e.g., a RX control logic), a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the controller 114.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The TX controller 114 sets a resonance bandwidth of the source resonator 131. Based on the resonance bandwidth of the source resonator 131, a Q-factor of the source resonator 131 is set.

The RX controller 125 sets a resonance bandwidth of the target resonator 133. Based on the resonance bandwidth of the target resonator 133, a Q-factor of the target resonator 133 is set. For example, the resonance bandwidth of the source resonator 131 may be set to be wider or narrower than the resonance bandwidth of the target resonator 133.

The source device 110 and the target device 120 communicate with each other to share information about the resonance bandwidth of the source resonator 131 and the resonance bandwidth of the target resonator 133. If power desired or needed by the target device 120 is greater than a reference value, the Q-factor of the source resonator 131 may be set to be greater than 100. If the power desired or needed by the target device 120 is less than the reference value, the Q-factor of the source resonator 131 may be set to less than 100.

The source device 110 wirelessly transmits wake-up power used to wake up the target device 120, and broadcasts a configuration signal used to configure a wireless power transmission network. The source device 110 further receives, from the target device 120, a search frame including a receiving sensitivity of the configuration signal, and may further permit a join of the target device 120. The source device 110 may further transmit, to the target device 120, an ID used to identify the target device 120 in the wireless power transmission network. The source device 110 may further generate the charging power through a power control, and may further wirelessly transmit the charging power to the target device 120.

The target device 120 receives wake-up power from at least one of source devices, and activates a communication function, using the wake-up power. The target device 120 further receives, from at least one of the source devices, a configuration signal used to configure a wireless power transmission network, and may further select the source device 110 based on a receiving sensitivity of the configuration signal. The target device 120 may further wirelessly receive power from the selected source device 110.

Figure 2:
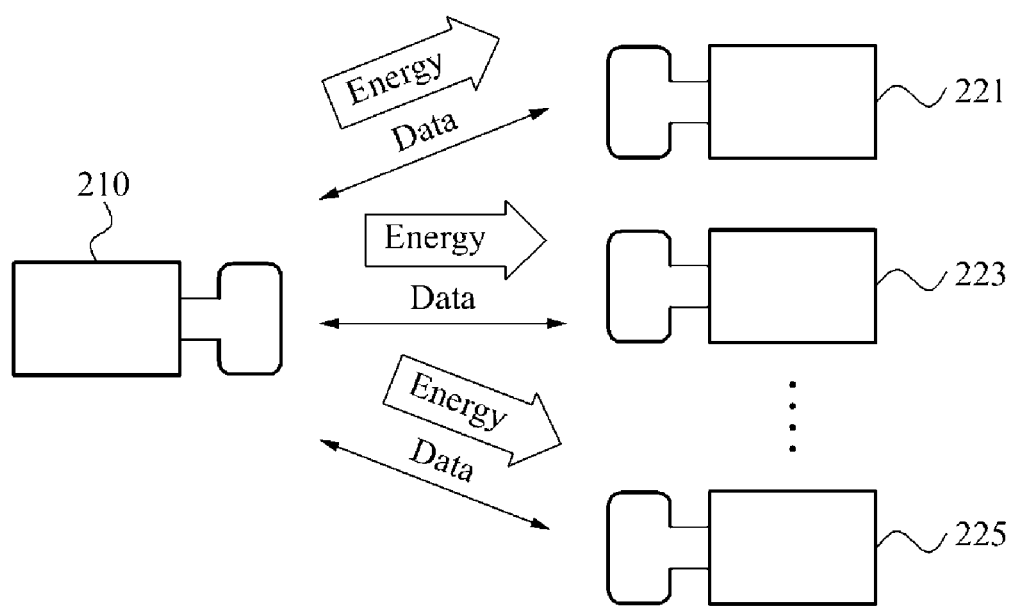
FIG. 2 is a diagram illustrating an example of a multi-target environment.

FIG. 2 is a diagram illustrating an example of a multi-target environment. Referring to FIG. 2, a source device 210 wirelessly and simultaneously transfers energy to target devices, for example, target devices 221, 223, and 225. That is, based on a wireless power transmission system employing a resonance scheme, the source device 210 simultaneously charges the target devices 221, 223, and 225.

Additionally, based on the wireless power transmission system employing the resonance scheme, the source device 210 and the target devices 221, 223, and 225 transmit and receive data using an in-band communication scheme, instead of using an out-band communication scheme. In the in-band communication scheme, power and a signal are transmitted only within a coupling region between a source resonator and a target resonator. In comparison to the out-band communication scheme, the in-band communication scheme may cause an interference in neighboring devices. As described herein, the out-band communication scheme may include communication using a communication channel, for example, a ZigBee channel, a Bluetooth channel, and/or other communication channels known to one of ordinary skill in the art. The in-band communication scheme includes communication using a power transmission channel.

Figure 3:
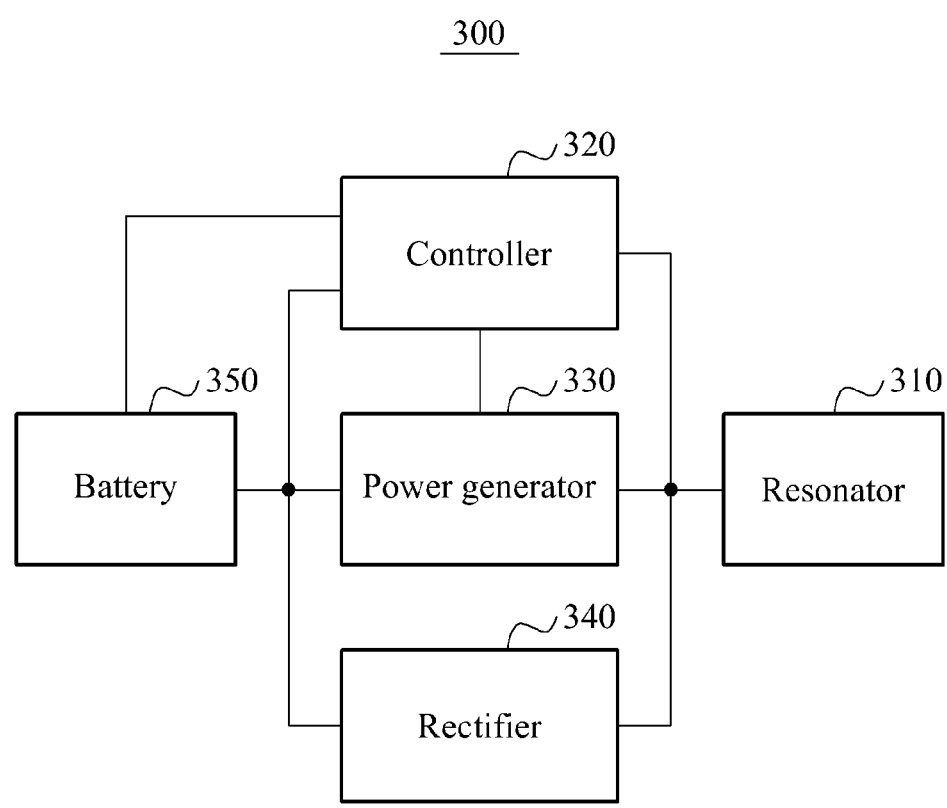
FIG. 3 is a block diagram illustrating an example of a wireless power transceiver.

FIG. 3 is a block diagram illustrating an example of a wireless power transceiver 300. Referring to FIG. 3, the wireless power transceiver 300 that transmits and receives wireless power includes a resonator 310, a controller 320, a power generator 330, a rectifier 340, and a battery 350.

The resonator 310 operates based on an operation mode of the wireless power transceiver 300. The operation mode includes a power reception mode and a power transmission mode. In the power reception mode, the resonator 310 operates as a target resonator that receives power, and in the power transmission mode, the resonator 310 operates as a source resonator that transmits power. In the power reception mode, the resonator 310 may receive power from a corresponding apparatus (e.g., a source device) through magnetic coupling. In the power transmission mode, the resonator 310 may transmit power to the corresponding apparatus (e.g., a target device) through the magnetic coupling.

Figure 5:
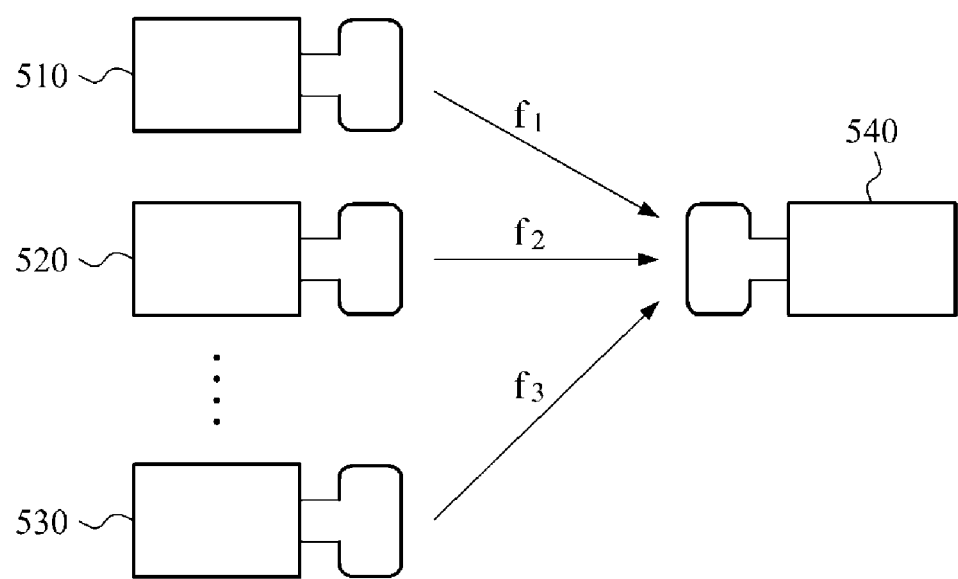
FIG. 5 is a diagram illustrating an example of a multi-source environment.

For example, in the power reception mode, the resonator 310 may receive power simultaneously from a plurality of corresponding apparatuses. An example of receiving power simultaneously from a plurality of corresponding apparatuses is illustrated in FIG. 5.

The controller 320 determines or selects the operation mode. The operation mode may be determined based on a remaining capacity of the battery 350 and a remaining capacity of a battery of the corresponding apparatus. For example, when the remaining capacity of the battery 350 is greater than the remaining capacity of the battery of the corresponding apparatus, the power transmission mode may be selected. Otherwise, the power reception mode may be selected.

The controller 320 may share information on the remaining capacity of the battery 350 with the corresponding apparatus through communication. The controller 320 may further set a resonant frequency of the power reception mode and a resonant frequency of the power transmission mode to be in different frequency bands.

The controller 320 may determine whether power transmission of the wireless power transceiver 300 is possible based on a distance between the wireless power transceiver 300 and the corresponding apparatus, and/or based on a power transmission efficiency between the wireless power transceiver 300 and the corresponding apparatus. For example, when the distance is longer than a predetermined distance, or when a transmission efficiency of power transmitted to or received from the corresponding apparatus is less than a predetermined value, the controller 320 may determine that the power transmission is difficult, and may interrupt the power transmission.

The controller 320 may receive, from the corresponding apparatus, information on an amount of power received in the corresponding apparatus, and may calculate a transmission efficiency of power transmitted from the wireless power transceiver 300 to the corresponding apparatus (e.g., a power transmission efficiency of the power transmission mode) based on the received information and an amount of power output from the power generator 330. The controller 320 may further receive, from the corresponding apparatus, information on an amount of power transmitted from the corresponding apparatus, and may calculate a power transmission efficiency of power transmitted from the corresponding apparatus to the wireless power transceiver 300 (e.g., a power reception efficiency of the power reception mode) based on the received information and an amount of power received in the wireless power transceiver 300. The controller 320 may further calculate the amount of the power received in the wireless power transceiver 300 based on voltage and current measured between the resonator 310 and the rectifier 340, or voltage and current measured at an output end of the rectifier 340.

The power generator 330 generates power, and transfers the power to the resonator 310, when the wireless power transceiver 300 operates in the power transmission mode. The power generator 330 may include the variable SMPS 111 and the PA 112 of FIG. 1.

The rectifier 340 rectifies an AC voltage received in the resonator 310 to generate a DC voltage, when the wireless power transceiver 300 operates in the power reception mode. The rectifier 340 may perform the same function as the rectifier 122 of FIG. 1.

The battery 350 is charged with the DC voltage output from the rectifier 340. The battery 350 may further supply voltage and current to the power generator 330.

Although not illustrated in FIG. 3, the wireless power transceiver 300 may further include the matching network 113 of FIG. 1. The wireless power transceiver 300 may further include a communication module that performs the same functions as the communication units 115 and 124 of FIG. 1.

Figure 4:
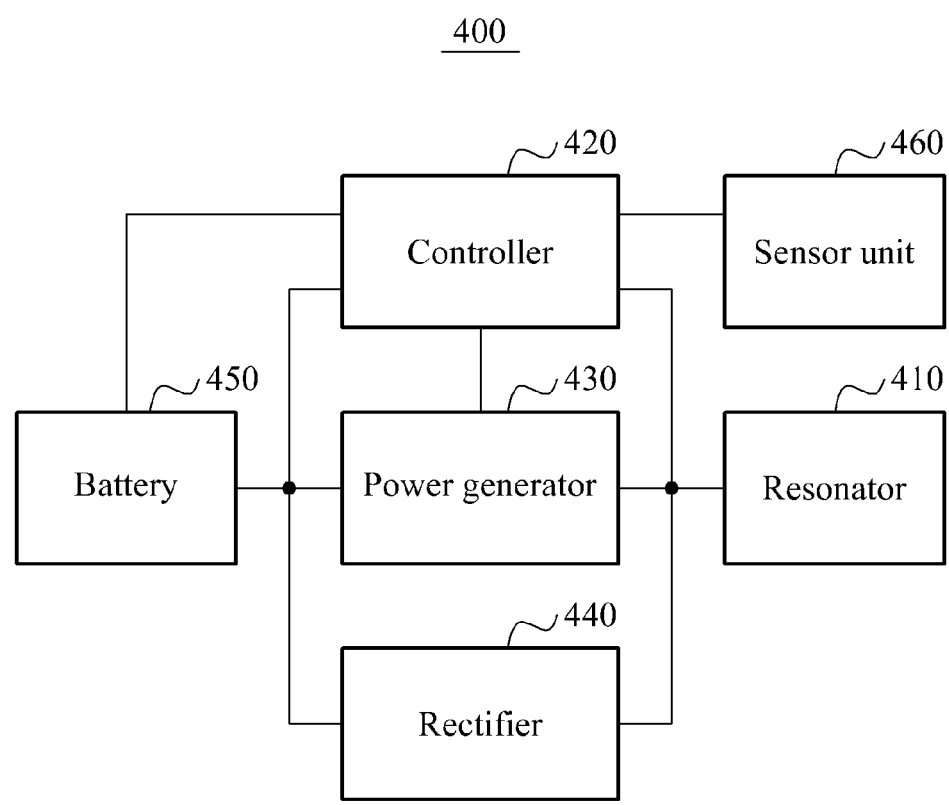
FIG. 4 is a block diagram illustrating another example of a wireless power transceiver.

FIG. 4 is a block diagram illustrating another example of a wireless power transceiver 400. Referring to FIG. 4, the wireless power transceiver 400 that transmits and receives wireless power includes a resonator 410, a controller 420, a power generator 430, a rectifier 440, a battery 450, and a sensor unit 460 that senses a presence of a corresponding apparatus, e.g., another wireless power transceiver.

The resonator 410, the controller 420, the power generator 430, the rectifier 440, and the battery 450 that are included in the wireless power transceiver 400 may perform the same functions as the resonator 310, the controller 320, the power generator 330, the rectifier 340, and the battery 350, respectively, that are included in the wireless power transceiver 300 of FIG. 3. Accordingly, further description of the resonator 410, the controller 420, the power generator 430, the rectifier 440, and the battery 450 will be made with reference to FIG. 3.

The sensor unit 460 senses the presence of the corresponding apparatus, by sensing a change in impedance of the resonator 410, or by sensing an approach of a metallic material. For example, the sensor unit 460 may periodically broadcast a signal used to sense the change in the impedance of the resonator 410. When the sensor unit 460 senses the change in the impedance of the resonator 410 based on the signal, the controller 420 may broadcast a response request signal. When the wireless power transceiver 400 receives, from the corresponding apparatus, a response signal corresponding to the response request signal, the controller 420 may determine that the corresponding apparatus exists. When the wireless power transceiver 400 does not receive the response signal within a predetermined period of time, the controller 420 may determine that the corresponding apparatus does not exist. The sensor unit 460 may further include a distance sensor that senses the approach of the metallic material.

FIG. 5 is a diagram illustrating an example of a multi-source environment. Referring to FIG. 5, a wireless power transceiver 540 operates in a power reception mode, and wireless power transceivers 510, 520 and 530 operate in a power transmission mode. The wireless power transceivers 510, 520 and 530 operate at different resonant frequencies f1, f2, and f3, respectively. In another example, the wireless power transceivers 510, 520, and 530 may operate at a single resonant frequency selected from the resonant frequencies f1, f2, and f3. If the wireless power transceivers 510, 520 and 530 operate at the same resonant frequency, the wireless power transceiver 540 may receive power simultaneously from a plurality of corresponding apparatuses, namely, the wireless power transceivers 510, 520 and 530.

Figure 6:
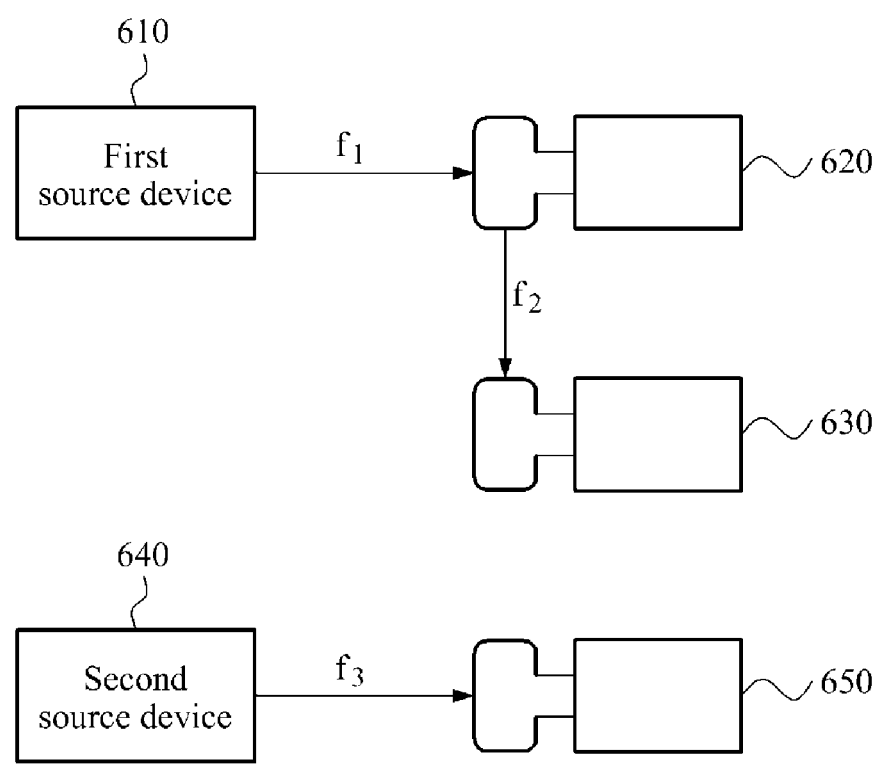
FIG. 6 is a diagram illustrating an example of a multi-source and multi-target environment.

FIG. 6 is a diagram illustrating an example of a multi-source and multi-target environment. Referring to FIG. 6, a first source device 610 and a second source device 640 are installed adjacent to each other. The first source device 610 and the second source device 640 operate at different resonant frequencies f1 and f3, respectively.

An operation mode of a wireless power transceiver 620 may include, for example, a power reception mode, a power transmission mode, and a relay mode. In the relay mode, a wireless power transceiver receives wireless power (e.g., relay power) from a source device, and relays or transfers the wireless power to a corresponding apparatus, e.g., another wireless power transceiver. For example, in the relay mode, the wireless power transceiver 620 receives wireless power from the first source device 610, using the resonant frequency f1, and relays the wireless power to a corresponding apparatus (e.g., a wireless power transceiver) 630, using a resonant frequency f2. Referring to FIG. 3, when the wireless power transceiver 300 operates in the relay mode, the resonator 310 may not be electrically-connected to the controller 320, the power generator 330, and the rectifier 340.

Referring again to FIG. 6, the first source device 610 transmits wireless power to the wireless power transceiver 620, using the resonant frequency f1. Simultaneously, the second source device 640 transmits wireless power to a wireless power transceiver 650, using the resonant frequency f3.

Figure 7:
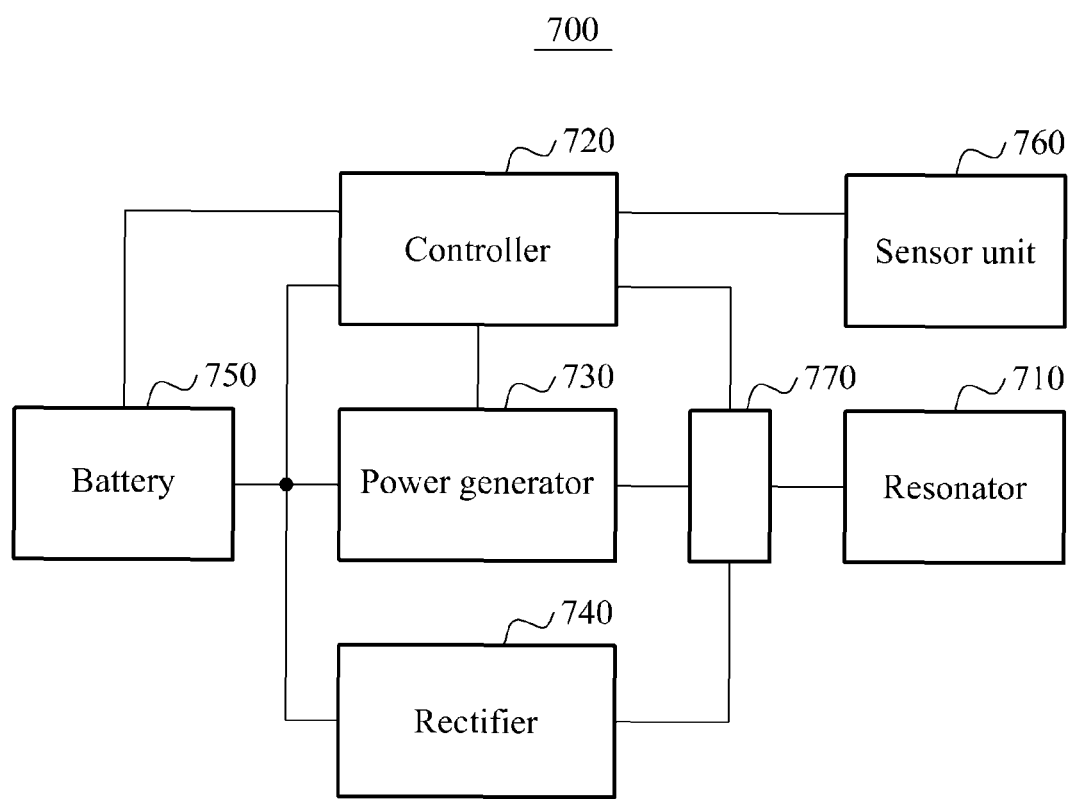
FIG. 7 is a block diagram illustrating still another example of a wireless power transceiver.

FIG. 7 is a block diagram illustrating still another example of a wireless power transceiver 700. Referring to FIG. 7, the wireless power transceiver 700 that transmits and receives wireless power includes a resonator 710, a controller 720, a power generator 730, a rectifier 740, a battery 750, a sensor unit 760, and a path controller 770.

The resonator 710, the controller 720, the power generator 730, the rectifier 740, the battery 750, and the sensor unit 760 that are included in the wireless power transceiver 700 may perform the same functions as the resonator 410, the controller 420, the power generator 430, the rectifier 440, the battery 450, and the sensor unit 460, respectively, that are included in the wireless power transceiver 400 of FIG. 4. Accordingly, further description of the resonator 710, the controller 720, the power generator 730, the rectifier 740, the battery 750, and the sensor unit 760 will be made with reference to FIG. 4.

The path controller 770 controls at least one electrical pathway of the wireless power transceiver 700 based on an operation mode of the wireless power transceiver 700. When the wireless power transceiver 700 operates in a power transmission mode, the path controller 770 electrically connects the power generator 730 and the resonator 710. When the wireless power transceiver 700 operates in a power reception mode, the path controller 770 electrically connects the rectifier 740 and the resonator 710. When the wireless power transceiver 700 operates in a relay mode, the path controller 770 performs switching so that the resonator 710 may be electrically and periodically connected to either the power generator 730 or the rectifier 740. For example, the path controller 770 may electrically connect the resonator 710 to the power generator 730 in a first time interval, and may electrically connect the resonator 710 to the rectifier 740 in a second time interval. In this example, resonant frequencies f1 and f2 may be used in the first time interval and the second time interval, respectively.

The controller 720 provides a user interface associated with wireless power transmission of the wireless power transceiver 700. For example, the controller 720 may include a processor that provides the user interface associated with the wireless power transmission. The controller 720 receives, through the user interface, a command for the controller 720 to execute an application that selects the power reception mode, the power transmission mode, or the relay mode.

The controller 720 may display, through the user interface, wireless charging information used by a user to select the power reception mode, the power transmission mode, or the relay mode. For example, the wireless charging information may include information on a remaining capacity of the battery 750 and/or a battery of a corresponding apparatus (e.g., another wireless power transceiver), information on an amount of power to be transmitted (e.g., from the wireless power transceiver 700), information on a power reception efficiency of the power reception mode, and/or information on a power transmission efficiency of the power transmission mode.

Figure 8A:
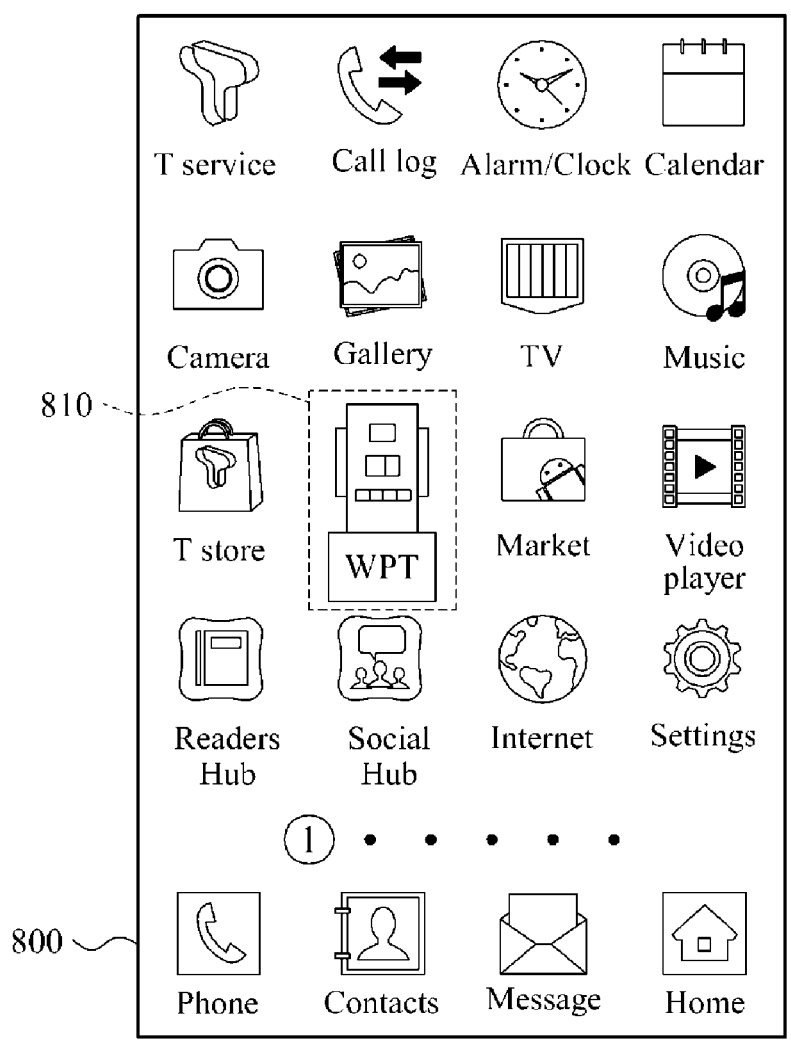
FIGS. 8A and 8B are diagrams illustrating examples of a user interface.
Figure 8B:
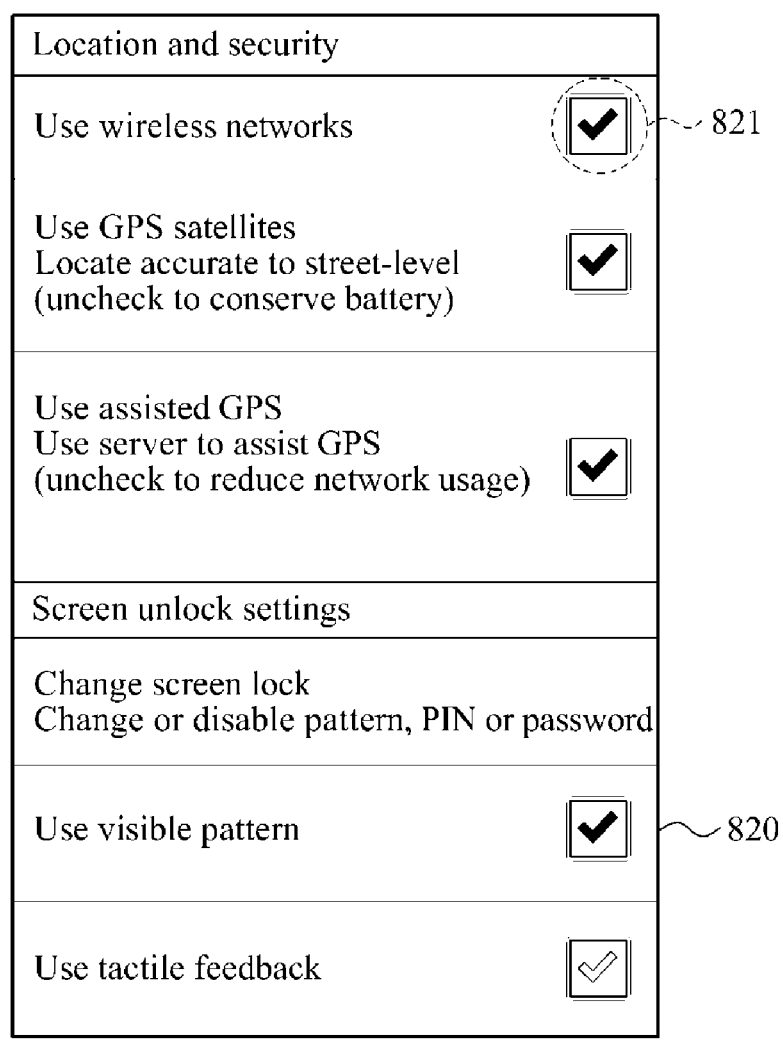

FIGS. 8A and 8B are diagrams illustrating examples of a user interface. Referring to FIG. 8A, a display screen 800 displays an icon 810 that enables a user to select an application associated with wireless power transmission. Referring to FIGS. 8A and 8B, when the user selects or touches the icon 810, the display screen 800 displays an interface 820 that enables the user to set the wireless power transmission. For example, the interface 820 includes a box 821 that the user may check to enable the wireless power transmission to use wireless networks.

Figure 9A:
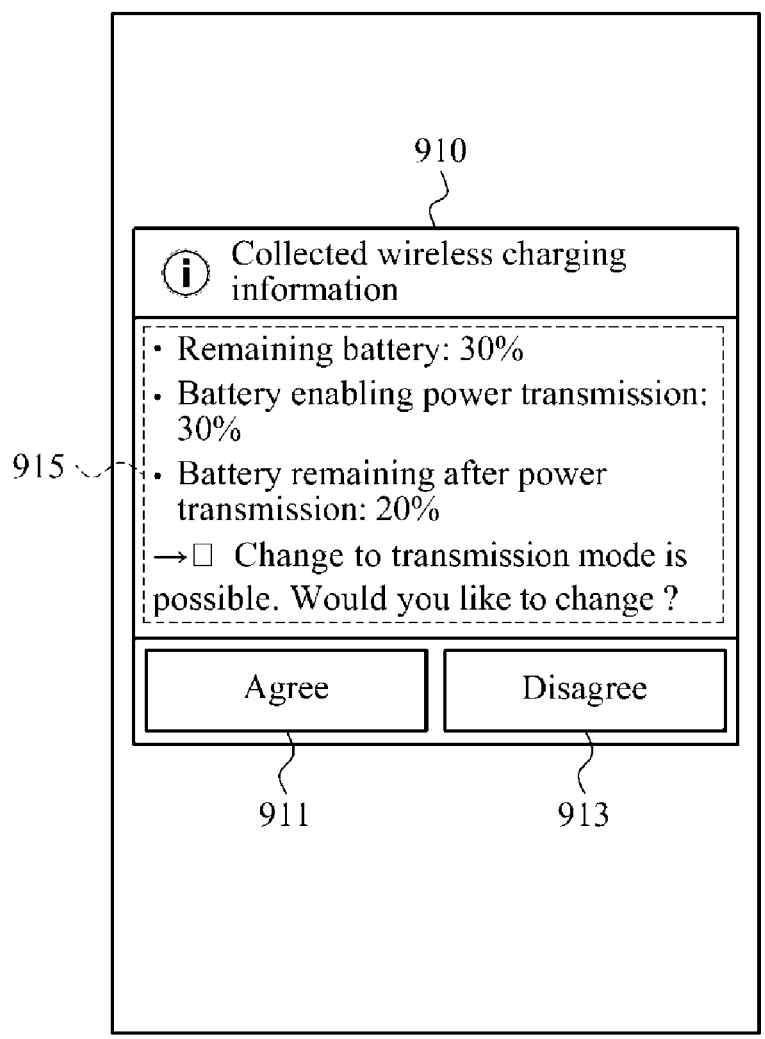
FIGS. 9A and 9B are diagrams illustrating other examples of a user interface.
Figure 9B:
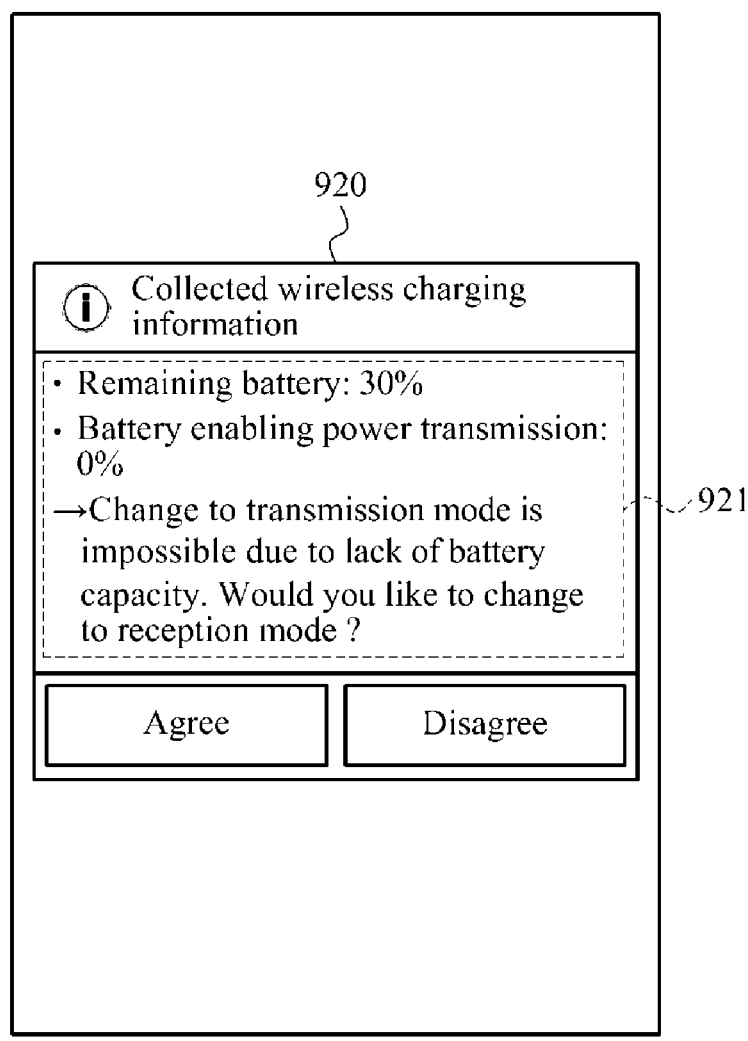

FIGS. 9A and 9B are diagrams illustrating other examples of a user interface. Referring to FIG. 9A, a user interface 910 asks a user whether he or she would like to change a current operation mode of wireless power transmission to a power transmission mode due to the power transmission mode being possible. The user interface 910 further includes icons 911 and 913 that enable the user to "Agree" or "Disagree", respectively, with the change of the modes. The user interface 910 further includes a window 915 including collected wireless charging information and the question above.

Referring to FIG. 9B, a user interface 910 asks the user whether he or she would like to change the current operation mode to a power reception mode due to the power transmission mode being impossible due to lack of a battery capacity. The user interface 920 further includes a window 921 including collected wireless charging information and the question above.

Figure 10:
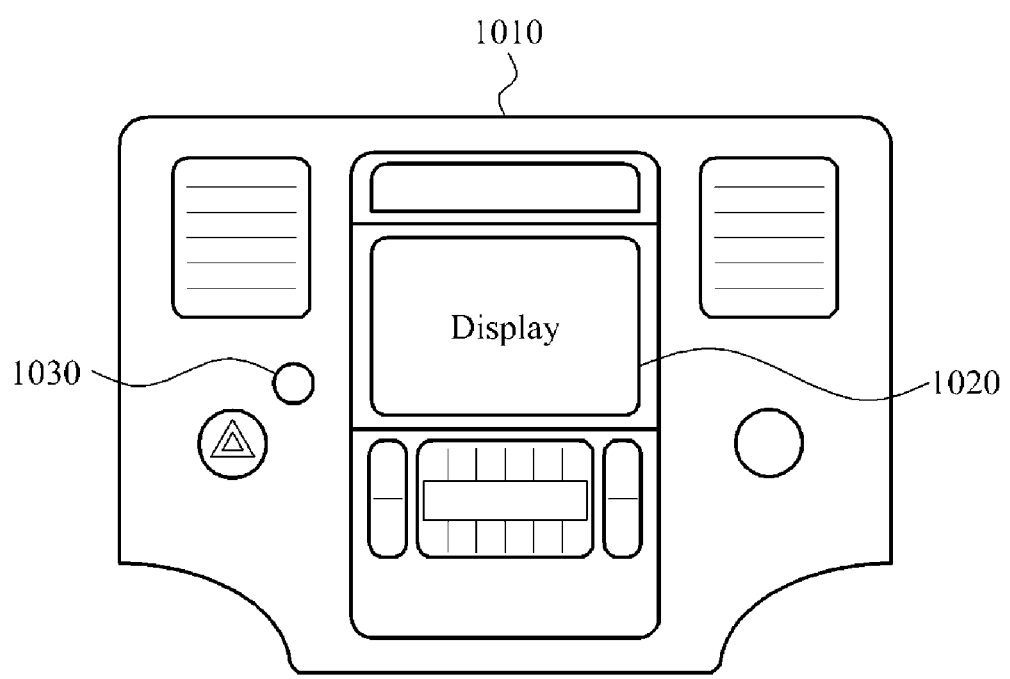
FIG. 10 is a diagram illustrating an example of a display unit in a wireless power transceiver.

FIG. 10 is a diagram illustrating an example of a display unit 1020 in a wireless power transceiver. When an electric vehicle is used as a wireless power receiver, a dashboard 1010 of the electric vehicle includes the display unit 1020 that displays a charging region of a wireless power transmitter and a location of the electric vehicle. The dashboard 1010 further includes a charging button 1030. When the electric vehicle is located in the charging region and is aligned with the wireless power transmitter, a user may press the charging button 1030 to start or terminate charging of the electric vehicle. When the electric vehicle is located in the charging region, despite not being aligned with the wireless power transmitter, the user may also press the charging button 1030 to start or terminate the charging of the electric vehicle.

Figure 11:
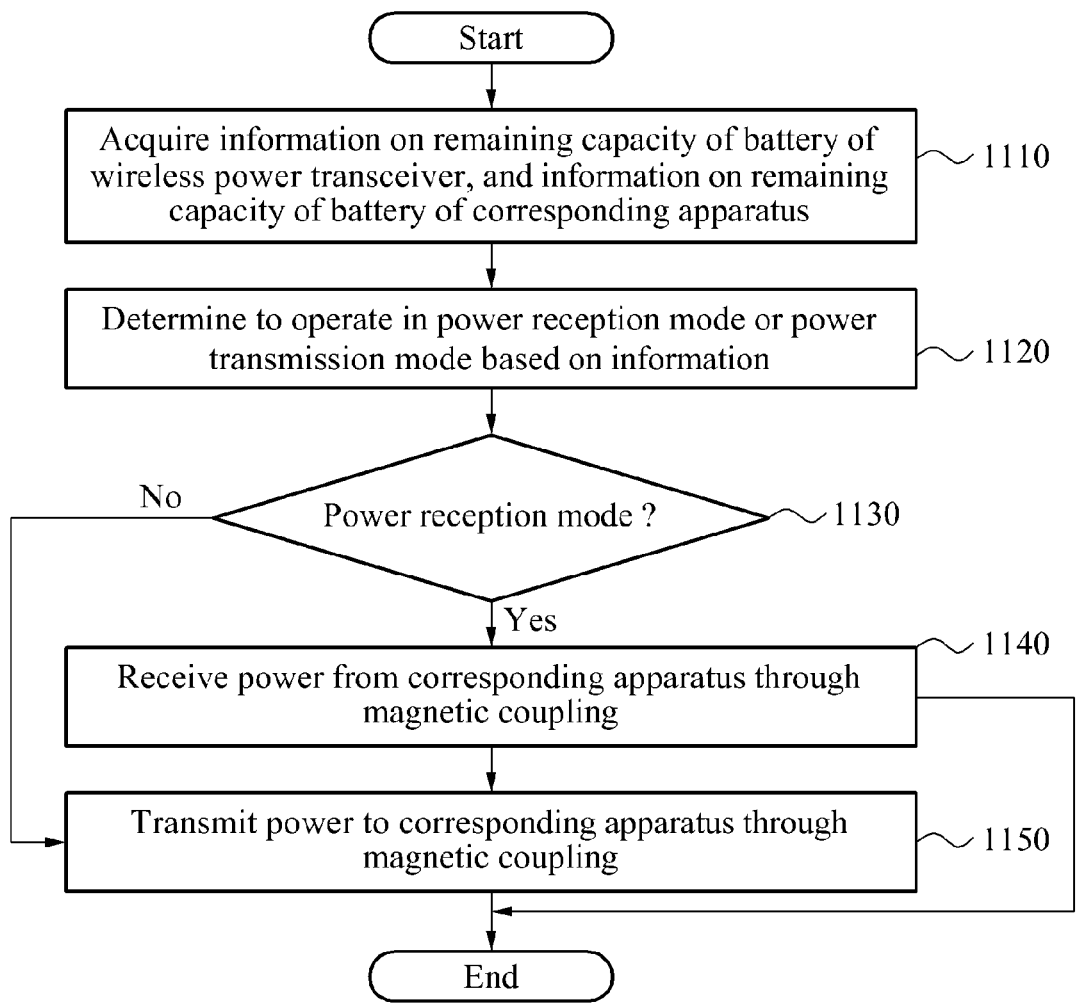
FIG. 11 is a flowchart illustrating an example of a method of transmitting and receiving wireless power.

FIG. 11 is a flowchart illustrating an example of a method of transmitting and receiving wireless power. The method of FIG. 11 may be performed by a wireless power transceiver, e.g., of FIGS. 3 through 7.

In operation 1110, the wireless power transceiver acquires information on a remaining capacity of a battery of the wireless power transceiver, and information on a remaining capacity of a battery of a corresponding apparatus, e.g., another wireless power transceiver. For example, the wireless power transceiver may acquire the information on the remaining capacity of the battery of the corresponding apparatus, through communication with the corresponding apparatus.

In operation 1120, the wireless power transceiver determines whether the wireless power transceiver is to operate in either a power reception mode or a power transmission mode based on the information. For example, when the remaining capacity of the battery of the wireless power transceiver is greater than the remaining capacity of the battery of the corresponding apparatus by a predetermined value, the wireless power transceiver may determine that the wireless power transceiver is to operate in the power transmission mode. In another example, when the remaining capacity of the battery of the wireless power transceiver is greater than the remaining capacity of the battery of the corresponding apparatus by at least 10%, the wireless power transceiver may determine that the wireless power transceiver is to operate in the power transmission mode. Otherwise, the wireless power transceiver may determine that the wireless power transceiver is to operate in the power reception mode.

In operation 1130, the wireless power transceiver determines whether the wireless power transceiver is to operate in the power reception mode. When the wireless power transceiver is determined to operate in the power reception mode, the method continues in operation 1140. Otherwise, the method continues in operation 1050.

In operation 1140, the wireless power transceiver receives power from the corresponding apparatus through magnetic coupling.

In operation 1150, the wireless power transceiver transmits power to the corresponding apparatus through the magnetic coupling.

Figure 12:
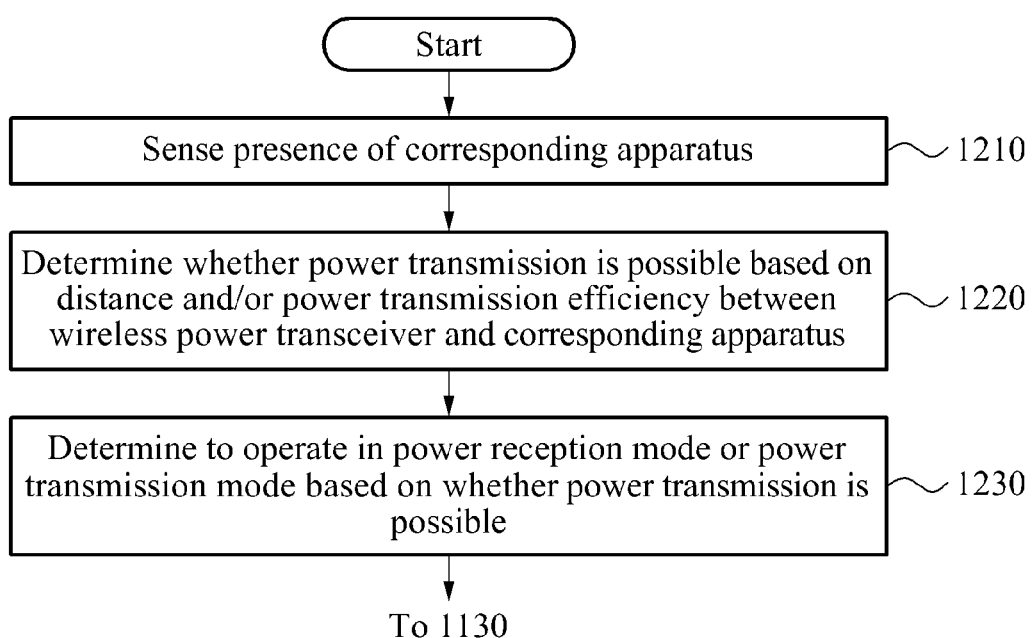
FIG. 12 is a flowchart illustrating another example of a method of transmitting and receiving wireless power.

FIG. 12 is a flowchart illustrating another example of a method of transmitting and receiving wireless power. The method of FIG. 12 may be performed by a wireless power transceiver, e.g., of FIGS. 3 through 7.

In operation 1210, the wireless power transceiver senses a presence of a corresponding apparatus, e.g., another wireless power transceiver.

In operation 1220, the wireless power transceiver determines whether power transmission of the wireless power transceiver is possible based on a distance between the wireless power transceiver and the corresponding apparatus, and/or based on a power transmission efficiency between the wireless power transceiver and the corresponding apparatus.

In operation 1230, the wireless power transceiver determines whether the wireless power transceiver is to operate in either a power reception mode or a power transmission mode based on whether the power transmission is determined to be possible. When the power transmission is determined to be possible, the wireless power transceiver determines that the wireless power transceiver is to operate in the power transmission mode. Otherwise, the wireless power transceiver determines that the wireless power transceiver is to operate in the power reception mode.

Subsequently, the wireless power transceiver performs operations 1130 through 1150 of FIG. 11. For example, in the power reception mode, the wireless power transceiver may receive power from the corresponding apparatus through magnetic coupling, or in the power transmission mode, the wireless power transceiver may transmit power to the corresponding apparatus through the magnetic coupling. Accordingly, further description of operations 1130 through 1150 will be made with reference to FIG. 11.

Referring to FIG. 5, for example, when the wireless power transceiver 540 is located adjacent to the wireless power transceivers 510, 520 and 530 within a predetermined distance, and when the wireless power transceivers 510, 520 and 530 operate in the power transmission mode, the wireless power transceiver 540 may determine to operate in the power reception mode. The wireless power transceiver 540 may further determine whether the wireless power transceivers 510, 520 and 530 operate in the power transmission mode, through communication with the wireless power transceiver 510, 520, and 530. For example, each of the wireless power transceivers 510, 520, 530 and 540 may periodically broadcast information on a current operation mode to a neighboring apparatus, through out-band communication, and may receive, from the neighboring apparatus, and verify information on a current operation mode of the neighboring apparatus.

Figure 13:
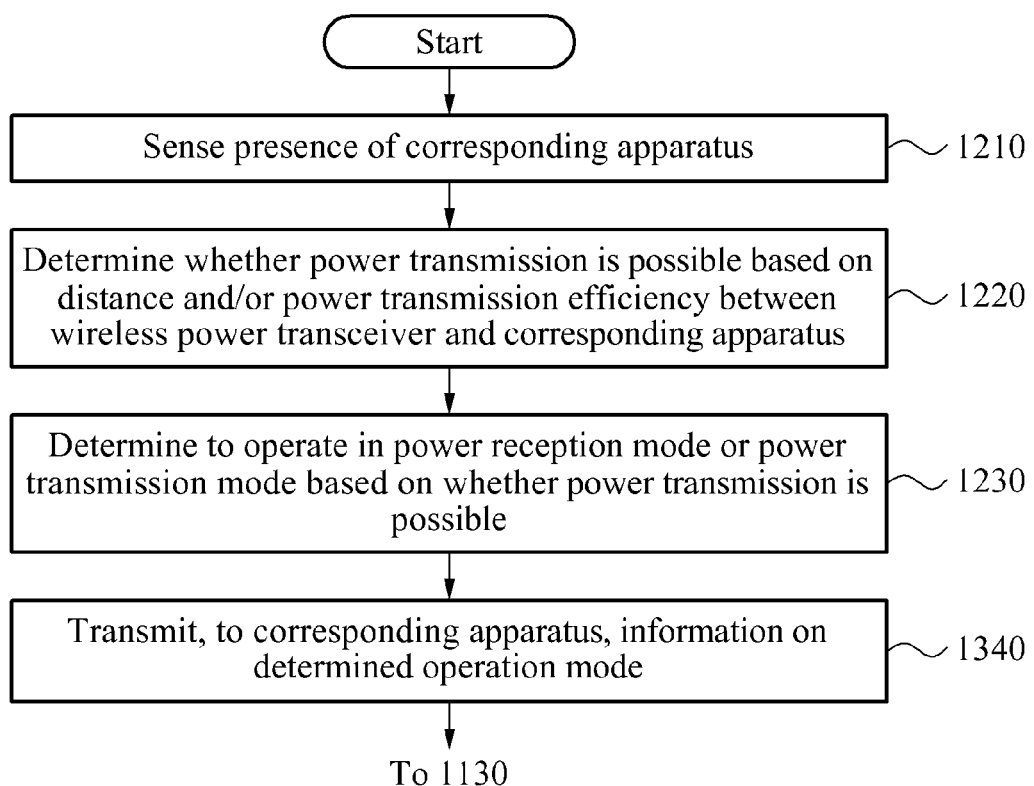
FIG. 13 is a flowchart illustrating still another example of a method of transmitting and receiving wireless power.

FIG. 13 is a flowchart illustrating still another example of a method of transmitting and receiving wireless power. The method of FIG. 13 may be performed by a wireless power transceiver, e.g., of FIGS. 3 through 7. The method of FIG. 13 may further be performed by adding operation 1340 to operations 1210 through 1230 of FIG. 12. Accordingly, further description of operations 1210 through 1230 will be made with reference to FIG. 12.

In operation 1340, the wireless power transceiver transmits, to a corresponding apparatus, information on an operation mode of the wireless power transceiver that is determined in operation 1230. Through operation 1340, the corresponding apparatus may receive, from the wireless power transceiver, and verify the information on the operation mode of the wireless power transceiver.

Subsequently, the wireless power transceiver performs operation 1130 through 1150 of FIG. 11. Accordingly, further description of operations 1130 through 1150 will be made with reference to FIG. 11.

In the following description, the term "resonator" used in the discussion of FIGS. 14A through 16B refers to both a source resonator and a target resonator. The resonators of FIGS. 14A through 16B may be applied to the resonators of FIGS. 1 through 13.

Figure 14A:
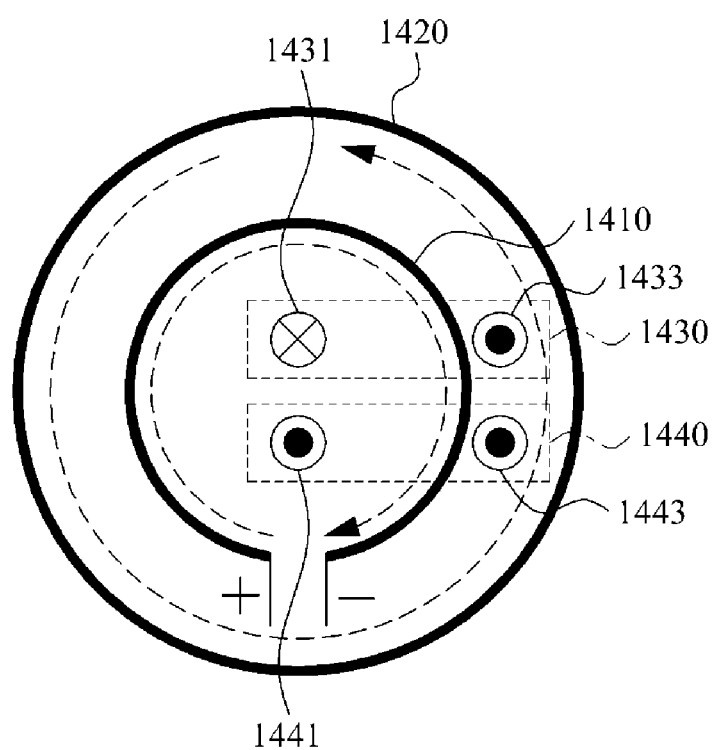
FIGS. 14A and 14B are diagrams illustrating examples of a distribution of a magnetic field in a feeder and a resonator of a wireless power transmitter.
Figure 14B:
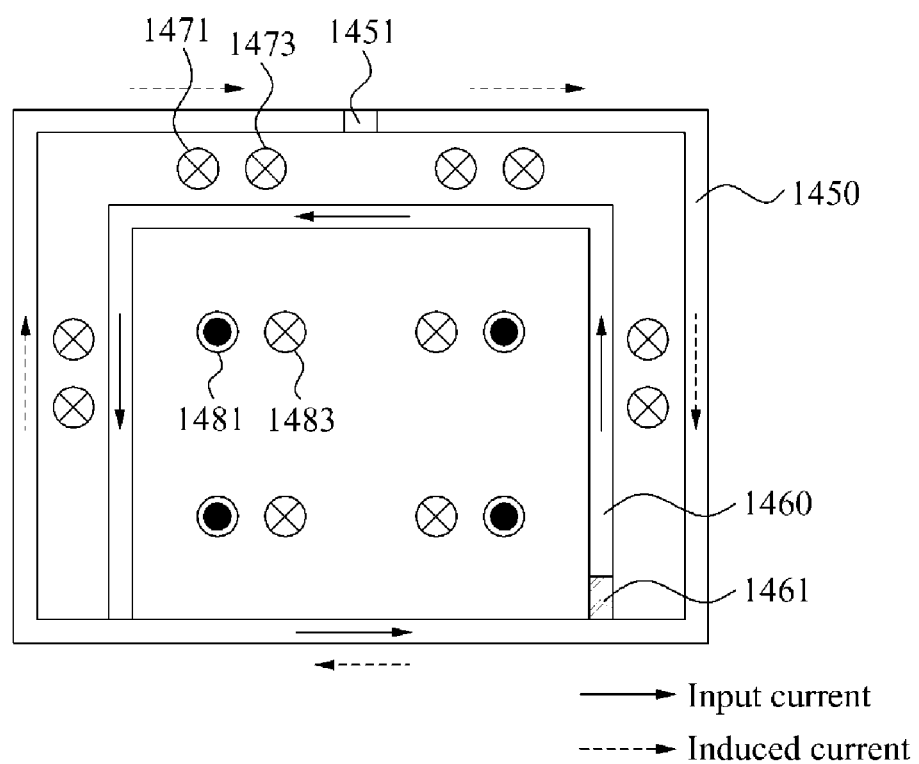

FIGS. 14A and 14B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 14A illustrates an example of a structure of a wireless power transmitter in which a feeder 1410 and a resonator 1420 do not have a common ground. Referring to FIG. 14A, as an input current flows into a feeder 1410 through a terminal labeled "+" and out of the feeder 1410 through a terminal labeled "−", a magnetic field 1430 is formed by the input current. A direction 1431 of the magnetic field 1430 inside the feeder 1410 is into the plane of FIG. 14A, and has a phase that is opposite to a phase of a direction 1433 of the magnetic field 1430 outside the feeder 1410. The magnetic field 1430 formed by the feeder 1410 induces a current to flow in a resonator 1420. The direction of the induced current in the resonator 1420 is opposite to a direction of the input current in the feeder 1410 as indicated by the dashed arrows in FIG. 14A.

The induced current in the resonator 1420 forms a magnetic field 1440. Directions of the magnetic field 1440 are the same at all positions inside the resonator 1420. Accordingly, a direction 1441 of the magnetic field 1440 formed by the resonator 1420 inside the feeder 1410 has the same phase as a direction 1443 of the magnetic field 1440 formed by the resonator 1420 outside the feeder 1410.

Consequently, when the magnetic field 1430 formed by the feeder 1410 and the magnetic field 1440 formed by the resonator 1420 are combined, a strength of the total magnetic field decreases inside the feeder 1410 and increases outside the feeder 1410. In an example in which power is supplied to the resonator 1420 through the feeder 1410 configured as illustrated in FIG. 14A, the strength of the total magnetic field decreases in the center of the resonator 1420, but increases outside the resonator 1420. In another example in which a magnetic field is randomly distributed in the resonator 1420, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 14B illustrates an example of a structure of a wireless power transmitter in which a resonator 1450 and a feeder 1460 have a common ground. The resonator 1450 includes a capacitor 1451. The feeder 1460 receives a radio frequency (RF) signal via a port 1461. When the RF signal is input to the feeder 1460, an input current is generated in the feeder 1460. The input current flowing in the feeder 1460 forms a magnetic field, and a current is induced in the resonator 1450 by the magnetic field. Additionally, another magnetic field is formed by the induced current flowing in the resonator 1450. In this example, a direction of the input current flowing in the feeder 1460 has a phase opposite to a phase of a direction of the induced current flowing in the resonator 1450. Accordingly, in a region between the resonator 1450 and the feeder 1460, a direction 1471 of the magnetic field formed by the input current has the same phase as a direction 1473 of the magnetic field formed by the induced current, and thus the strength of the total magnetic field increases in the region between the resonator 1450 and the feeder 1460. Conversely, inside the feeder 1460, a direction 1481 of the magnetic field formed by the input current has a phase opposite to a phase of a direction 1483 of the magnetic field formed by the induced current, and thus the strength of the total magnetic field decreases inside the feeder 1460. Therefore, the strength of the total magnetic field decreases in the center of the resonator 1450, but increases outside the resonator 1450.

An input impedance may be adjusted by adjusting an internal area of the feeder 1460. The input impedance refers to an impedance viewed in a direction from the feeder 1460 to the resonator 1450. When the internal area of the feeder 1460 is increased, the input impedance is increased. Conversely, when the internal area of the feeder 1460 is decreased, the input impedance is decreased. Because the magnetic field is randomly distributed in the resonator 1450 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 15A:
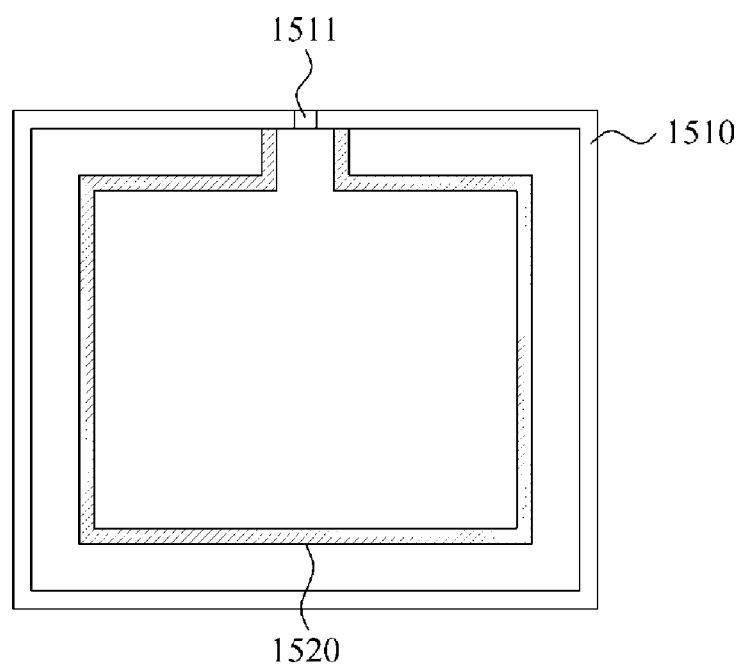
FIGS. 15A and 15B are diagrams illustrating an example of a feeding unit and a resonator of a wireless power transmitter.
Figure 15B:
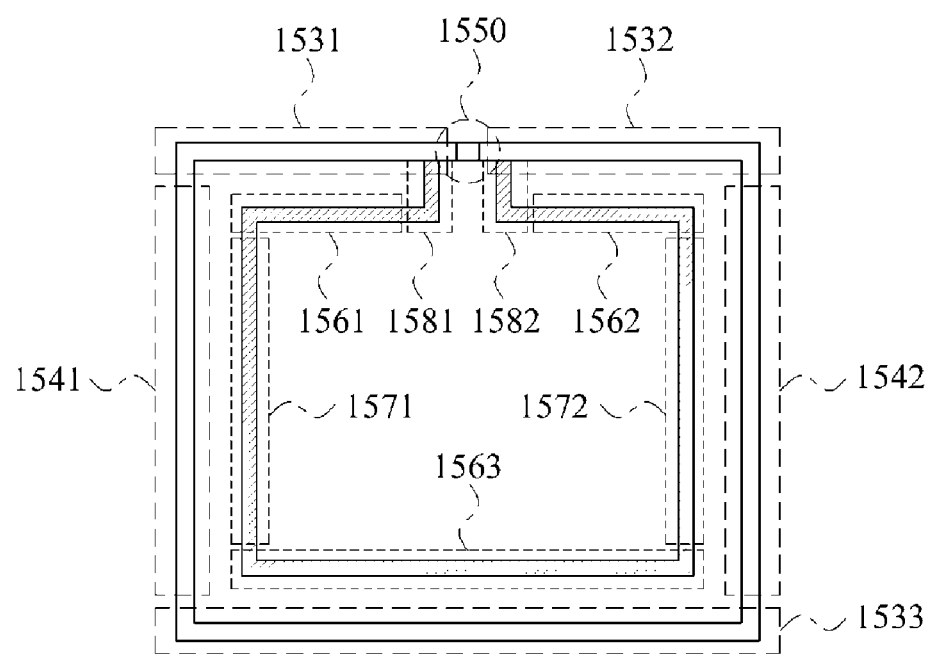

FIGS. 15A and 15B are diagrams illustrating an example of a feeding unit and a resonator of a wireless power transmitter. Referring to FIG. 15A, the wireless power transmitter includes a resonator 1510 and a feeding unit 1520. The resonator 1510 further includes a capacitor 1511. The feeding unit 1520 is electrically connected to both ends of the capacitor 1511.

FIG. 15B illustrates, in greater detail, a structure of the wireless power transmitter of FIG. 15A. The resonator 1510 includes a first transmission line (not identified by a reference numeral in FIG. 15B, but formed by various elements in FIG. 15B as discussed below), a first conductor 1541, a second conductor 1542, and at least one capacitor 1550.

The capacitor 1550 is inserted in series between a first signal conducting portion 1531 and a second signal conducting portion 1532, causing an electric field to be confined within the capacitor 1550. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 15B is separated into two portions that will be referred to as the first signal conducting portion 1531 and the second signal conducting portion 1532. A conductor disposed in a lower portion of the first transmission line in FIG. 15B will be referred to as a first ground conducting portion 1533.

As illustrated in FIG. 15B, the resonator 1510 has a generally two-dimensional (2D) structure. The first transmission line includes the first signal conducting portion 1531 and the second signal conducting portion 1532 in the upper portion of the first transmission line, and includes the first ground conducting portion 1533 in the lower portion of the first transmission line. The first signal conducting portion 1531 and the second signal conducting portion 1532 are disposed to face the first ground conducting portion 1533. A current flows through the first signal conducting portion 1531 and the second signal conducting portion 1532.

One end of the first signal conducting portion 1531 is connected to one end of the first conductor 1541, the other end of the first signal conducting portion 1531 is connected to the capacitor 1550, and the other end of the first conductor 1541 is connected to one end of the first ground conducting portion 1533. One end of the second signal conducting portion 1532 is connected to one end of the second conductor 1542, the other end of the second signal conducting portion 1532 is connected to the other end of the capacitor 1550, and the other end of the second conductor 1542 is connected to the other end of the ground conducting portion 1533. Accordingly, the first signal conducting portion 1531, the second signal conducting portion 1532, the first ground conducting portion 1533, the first conductor 1541, and the second conductor 1542 are connected to each other, causing the resonator 1510 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1550 is inserted into an intermediate portion of the first transmission line. In the example in FIG. 15B, the capacitor 1550 is inserted into a space between the first signal conducting portion 1531 and the second signal conducting portion 1532. The capacitor 1550 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1550 inserted into the first transmission line may cause the resonator 1510 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1550 is a lumped element capacitor and a capacitance of the capacitor 1550 is appropriately determined, the resonator 1510 may have a characteristic of a metamaterial. If the resonator 1510 is caused to have a negative magnetic permeability by appropriately adjusting the capacitance of the capacitor 1550, the resonator 1510 may also be referred to as an MNG resonator. Various criteria may be applied to determine the capacitance of the capacitor 1550. For example, the various criteria may include a criterion for enabling the resonator 1510 to have the characteristic of the metamaterial, a criterion for enabling the resonator 1510 to have a negative magnetic permeability at a target frequency, a criterion for enabling the resonator 1510 to have a zeroth order resonance characteristic at the target frequency, and any other suitable criterion. Based on any one or any combination of the aforementioned criteria, the capacitance of the capacitor 1550 may be appropriately determined.

The resonator 1510, hereinafter referred to as the MNG resonator 1510, may have a zeroth order resonance characteristic of having a resonance frequency when a propagation constant is "0". If the MNG resonator 1510 has the zeroth order resonance characteristic, the resonance frequency is independent of a physical size of the MNG resonator 1510. By changing the capacitance of the capacitor 1550, the resonance frequency of the MNG resonator 1510 may be changed without changing the physical size of the MNG resonator 1510.

In a near field, the electric field is concentrated in the capacitor 1550 inserted into the first transmission line, causing the magnetic field to become dominant in the near field. The MNG resonator 1510 has a relatively high Q-factor when the capacitor 1550 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 15B, a magnetic core passing through the MNG resonator 1510 may be provided to increase a power transmission distance.

Referring to FIG. 15B, the feeding unit 1520 includes a second transmission line (not identified by a reference numeral in FIG. 15B, but formed by various elements in FIG. 15B as discussed below), a third conductor 1571, a fourth conductor 1572, a fifth conductor 1581, and a sixth conductor 1582.

The second transmission line includes a third signal conducting portion 1561 and a fourth signal conducting portion 1562 in an upper portion of the second transmission line, and includes a second ground conducting portion 1563 in a lower portion of the second transmission line. The third signal conducting portion 1561 and the fourth signal conducting portion 1562 are disposed to face the second ground conducting portion 1563. A current flows through the third signal conducting portion 1561 and the fourth signal conducting portion 1562.

One end of the third signal conducting portion 1561 is connected to one end of the third conductor 1571, the other end of the third signal conducting portion 1561 is connected to one end of the fifth conductor 1581, and the other end of the third conductor 1571 is connected to one end of the second ground conducting portion 1563. One end of the fourth signal conducting portion 1562 is connected to one end of the fourth conductor 1572, the other end of the fourth signal conducting portion 1562 is connected to one end the sixth conductor 1582, and the other end of the fourth conductor 1572 is connected to the other end of the second ground conducting portion 1563. The other end of the fifth conductor 1581 is connected to the first signal conducting portion 1531 at or near where the first signal conducting portion 1531 is connected to one end of the capacitor 1550, and the other end of the sixth conductor 1582 is connected to the second signal conducting portion 1532 at or near where the second signal conducting portion 1532 is connected to the other end of the capacitor 1550. Thus, the fifth conductor 1581 and the sixth conductor 1582 are connected in parallel to both ends of the capacitor 1550. The fifth conductor 1581 and the sixth conductor 1582 are used as an input port to receive an RF signal as an input.

Accordingly, the third signal conducting portion 1561, the fourth signal conducting portion 1562, the second ground conducting portion 1563, the third conductor 1571, the fourth conductor 1572, the fifth conductor 1581, the sixth conductor 1582, and the resonator 1510 are connected to each other, causing the resonator 1510 and the feeding unit 1520 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 1581 or the sixth conductor 1582, input current flows through the feeding unit 1520 and the resonator 1510, generating a magnetic field that induces a current in the resonator 1510. A direction of the input current flowing through the feeding unit 1520 is identical to a direction of the induced current flowing through the resonator 1510, thereby causing a strength of a total magnetic field to increase in the center of the resonator 1510, and decrease near the outer periphery of the resonator 1510.

An input impedance is determined by an area of a region between the resonator 1510 and the feeding unit 1520. Accordingly, a separate matching network used to match the input impedance to an output impedance of a power amplifier may not be necessary. However, if a matching network is used, the input impedance may be adjusted by adjusting a size of the feeding unit 1520, and accordingly a structure of the matching network may be simplified. The simplified structure of the matching network may reduce a matching loss of the matching network.

The second transmission line, the third conductor 1571, the fourth conductor 1572, the fifth conductor 1581, and the sixth conductor 1582 of the feeding unit may have a structure identical to the structure of the resonator 1510. For example, if the resonator 1510 has a loop structure, the feeding unit 1520 may also have a loop structure. As another example, if the resonator 1510 has a circular structure, the feeding unit 1520 may also have a circular structure.

FIG. 16A is a diagram illustrating an example of a distribution of a magnetic field in a resonator that is produced by feeding of a feeding unit, of a wireless power transmitter. FIG. 16A more simply illustrates the resonator 1510 and the feeding unit 1520 of FIGS. 15A and 15B, and the names of the various elements in FIG. 15B will be used in the following description of FIG. 16A without reference numerals.

A feeding operation may be an operation of supplying power to a source resonator in wireless power transmission, or an operation of supplying AC power to a rectifier in wireless power transmission. FIG. 16A illustrates a direction of input current flowing in the feeding unit, and a direction of induced current flowing in the source resonator. Additionally, FIG. 16A illustrates a direction of a magnetic field formed by the input current of the feeding unit, and a direction of a magnetic field formed by the induced current of the source resonator.

Referring to FIG. 16A, the fifth conductor or the sixth conductor of the feeding unit 1520 may be used as an input port 1610. In FIG. 16A, the sixth conductor of the feeding unit is being used as the input port 1610. An RF signal is input to the input port 1610. The RF signal may be output from a power amplifier. The power amplifier may increase and decrease an amplitude of the RF signal based on a power requirement of a target device. The RF signal input to the input port 1610 is represented in FIG. 16A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 16A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 16A, within the feeding unit, a direction 1621 of the magnetic field generated by the input current flowing in the feeding unit is identical to a direction 1623 of the magnetic field generated by the induced current flowing in the resonator. Accordingly, a strength of the total magnetic field may increases inside the feeding unit.

In contrast, as illustrated in FIG. 16A, in a region between the feeding unit and the resonator, a direction 1633 of the magnetic field generated by the input current flowing in the feeding unit is opposite to a direction 1631 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 16A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 16B:
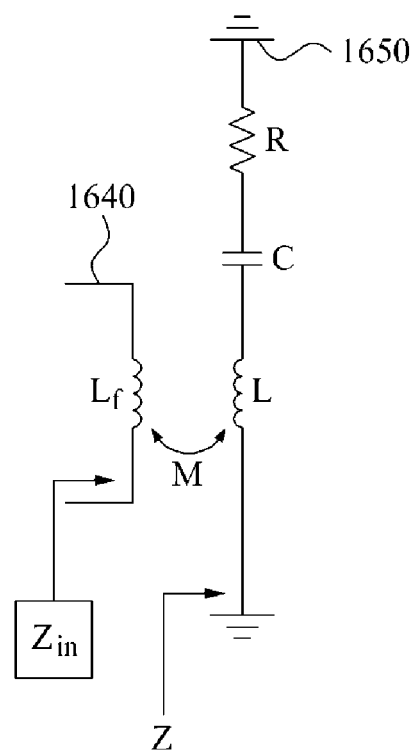
FIG. 16B is a diagram illustrating examples of equivalent circuits of a feeding unit and a resonator of a wireless power transmitter.

FIG. 16B is a diagram illustrating examples of equivalent circuits of a feeding unit and a resonator of a wireless power transmitter. Referring to FIG. 16B, a feeding unit 1640 and a resonator 1650 may be represented by the equivalent circuits in FIG. 16B. The feeding unit 1640 is represented as an inductor having an inductance $L_f$, and the resonator 1650 is represented as a series connection of an inductor having an inductance L coupled to the inductance $L_f$ of the feeding unit 1640 by a mutual inductance M, a capacitor having a capacitance C, and a resistor having a resistance R. An example of an input impedance $Z_{in}$ viewed in a direction from the feeding unit 1640 to the resonator 1650 may be expressed by the following Equation 1:

$$Z_{in} = \frac{(\omega M)^2}{Z} \quad (1)$$

In Equation 1, M denotes a mutual inductance between the feeding unit 1640 and the resonator 1650, ω denotes a resonance frequency of the feeding unit 1640 and the resonator 1650, and Z denotes an impedance viewed in a direction from the resonator 1650 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1640 and the resonator 1650. The area of the region between the feeding unit 1640 and the resonator 1650 may be adjusted by adjusting a size of the feeding unit 1640, thereby adjusting the mutual inductance M and the input impedance $Z_{in}$. Since the input impedance $Z_{in}$ may be adjusted by adjusting the size of the feeding unit 1640, it may be unnecessary to use a separate matching network to perform impedance matching with an output impedance of a power amplifier.

In a target resonator and a feeding unit included in a wireless power receiver, a magnetic field may be distributed as illustrated in FIG. 16A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 16A, a direction of the induced current flowing in the target resonator will be identical to a direction of the induced current flowing in the feeding unit. Accordingly, for the reasons discussed above in connection with FIG. 16A, a strength of the total magnetic field will increase inside the feeding unit, and will decrease in a region between the feeding unit and the target resonator.

Figure 17:
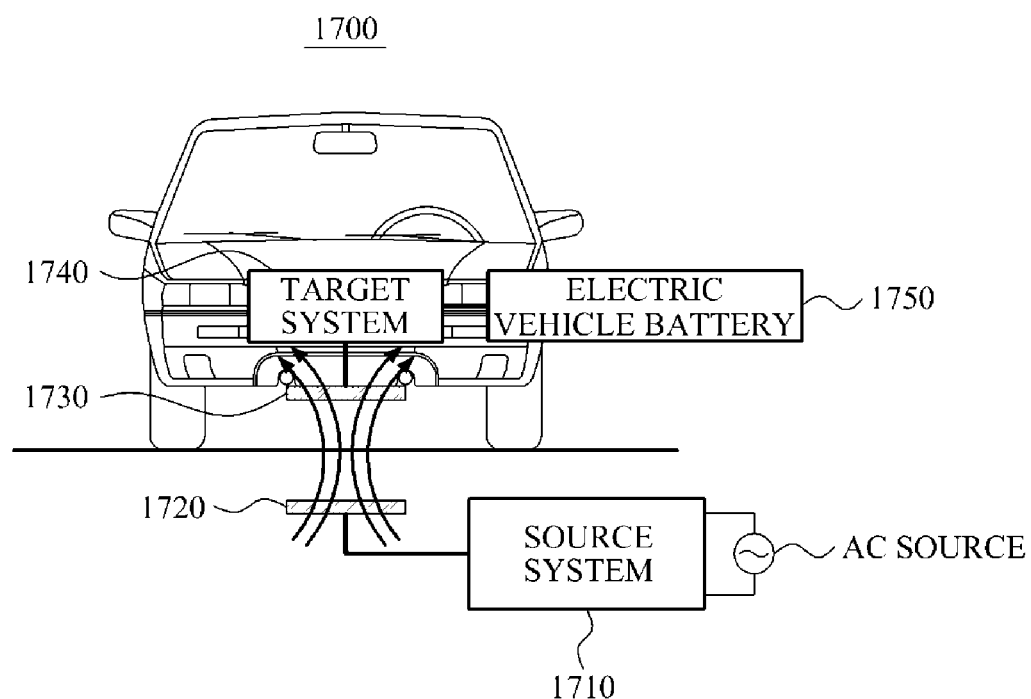
FIG. 17 is a diagram illustrating an example of an electric vehicle charging system.

FIG. 17 is a diagram illustrating an example of an electric vehicle charging system. Referring to FIG. 17, an electric vehicle charging system 1700 includes a source system 1710, a source resonator 1720, a target resonator 1730, a target system 1740, and an electric vehicle battery 1750.

In one example, the electric vehicle charging system 1700 has a structure similar to the structure of the wireless power transmission system of FIG. 1. The source system 1710 and the source resonator 1720 in the electric vehicle charging system 1700 operate as a source. The target resonator 1730 and the target system 1740 in the electric vehicle charging system 1700 operate as a target.

In one example, the source system 1710 includes an alternating current-to-direct current (AC/DC) converter, a power detector, a power converter, a control and communication (control/communication) unit similar to those of the source device 110 of FIG. 1. In one example, the target system 1740 includes a rectifier, a DC-to-DC (DC/DC) converter, a switch, a charging unit, and a control/communication unit similar to those of the target device 120 of FIG. 1. The electric vehicle battery 1750 is charged by the target system 1740. The electric vehicle charging system 1700 may use a resonant frequency in a band of a few kHz to tens of MHz.

The source system 1710 generates power based on a type of the vehicle being charged, a capacity of the electric vehicle battery 1750, and a charging state of the electric vehicle battery 1750, and wirelessly transmits the generated power to the target system 1740 via a magnetic coupling between the source resonator 1720 and the target resonator 1730.

The source system 1710 may control an alignment of the source resonator 1720 and the target resonator 1730. For example, when the source resonator 1720 and the target resonator 1730 are not aligned, the controller of the source system 1710 may transmit a message to the target system 1740 to control the alignment of the source resonator 1720 and the target resonator 1730.

For example, when the target resonator 1730 is not located in a position enabling maximum magnetic coupling, the source resonator 1720 and the target resonator 1730 are not properly aligned. When a vehicle does not stop at a proper position to accurately align the source resonator 1720 and the target resonator 1730, the source system 1710 may instruct a position of the vehicle to be adjusted to control the source resonator 1720 and the target resonator 1730 to be aligned. However, this is just an example, and other methods of aligning the source resonator 1720 and the target resonator 1730 may be used.

The source system 1710 and the target system 1740 may transmit or receive an ID of a vehicle and exchange various messages by performing communication with each other.

The descriptions of FIGS. 2 through 16B are also applicable to the electric vehicle charging system 1700. However, the electric vehicle charging system 1700 may use a resonant frequency in a band of a few kHz to tens of MHz, and may wirelessly transmit power that is equal to or higher than tens of watts to charge the electric vehicle battery 1750.

The examples of an electronic device and an electric vehicle described above may wirelessly receive power, and may wirelessly transmit power, at the same time. Additionally, the electronic device and the electric vehicle may wirelessly receive power, regardless of a location, when power is required.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus that transmits and receives wireless power, the apparatus comprising:
   a controller configured to determine an operation mode of the apparatus, the operation mode comprising a power reception mode and a power transmission mode;
   a communication unit configured to receive, from adjacent apparatuses, information on an operation mode of each of the adjacent apparatuses; and
   a resonator configured to receive power from the adjacent apparatuses in response to the apparatus being determined to operate in the power reception mode, and transmit power to the adjacent apparatuses in response to the apparatus being determined to operate in the power transmission mode,
   wherein the controller is further configured to determine the apparatus to operate in the power reception mode, in response to all of the adjacent apparatuses operating in the power transmission mode.

2. The apparatus of claim 1, further comprising:
   a sensor unit configured to sense a presence of the adjacent apparatuses.

3. The apparatus of claim 1, wherein the controller is further configured to:
   determine whether power transmission of the apparatus is possible based on a distance between the apparatus and the adjacent apparatuses or a power transmission efficiency between the apparatus and the adjacent apparatuses.

4. The apparatus of claim 3, wherein the controller is further configured to:
   determine whether the apparatus is to operate in the power reception mode or the power transmission mode based on whether the power transmission is determined to be possible.

5. The apparatus of claim 1, wherein:
   the resonator is further configured to receive power, using a resonant frequency of the power reception mode, and transmit power, using a resonant frequency of the power transmission mode; and the resonant frequency of the power reception mode and the resonant frequency of the power transmission mode are in different frequency bands.

6. The apparatus of claim 1, wherein:
   the controller is further configured to determine that the apparatus is to operate in a relay mode; and
   the resonator is further configured to receive a relay power from a device, using a first resonant frequency, and transmit the relay power to the adjacent apparatuses, using a second resonant frequency.

7. The apparatus of claim 1, further comprising:
   a path controller configured to control an electrical pathway of the apparatus based on whether the apparatus is determined to operate in the power reception mode or the power transmission mode.

8. An apparatus that transmits and receives wireless power, the apparatus comprising:
   a resonator configured to receive power from adjacent apparatuses in a power reception mode, and transmit power to the adjacent apparatuses in a power transmission mode;
   a communication unit configured to receive, from adjacent apparatuses, information on an operation mode of each of the adjacent apparatuses;
   a path controller configured to control an electrical pathway of the apparatus based on the power reception and transmission modes; and
   a controller configured to determine that the apparatus is to operate in the power reception mode in response to all of the adjacent apparatuses operating in the power transmission mode, and provide a user interface associated with wireless power transmission.

9. The apparatus of claim 8, wherein the path controller is further configured to:
   connect a power generator of the apparatus to the resonator in the power transmission mode; and
   connect a rectifier of the apparatus to the resonator in the power reception mode.

10. The apparatus of claim 8, wherein the controller is further configured to:
    display, through the user interface, wireless charging information used to select the power reception mode or the power transmission mode.

11. The apparatus of claim 10, wherein the wireless charging information comprises any one or any combination of two or more of a capacity of a battery of the apparatus, a capacity of a battery of the adjacent apparatuses, an amount of power to be transmitted, a power reception efficiency of the power reception mode, and a power transmission efficiency of the power transmission mode.

12. The apparatus of claim 8, wherein the controller is further configured to:
    receive, through the user interface, a command for the controller to select the power reception mode or the power transmission mode.

13. A method of transmitting and receiving wireless power in an apparatus that transmits and receives the wireless power, the method comprising:
    receiving, from adjacent apparatuses, information on an operation mode of each of the adjacent apparatuses;
    determine the operation mode of the apparatus based on the information on the operation mode of the adjacent apparatuses, the operation mode of the apparatus comprising a power reception mode and a power transmission mode;

receiving power from the adjacent apparatuses in response to the apparatus being determined to operate in the power reception mode; and transmitting power to the adjacent apparatuses in response to the apparatus being determined to operate in the power transmission mode, wherein the determining comprising determining the apparatus to operate in the power reception mode, in response to all of the adjacent apparatuses operating in the power transmission mode.

14. A method of transmitting and receiving wireless power in an apparatus that transmits and receives the wireless power, the method comprising:

sensing a presence of adjacent apparatuses;

receiving information on an operation mode of the adjacent apparatuses;

determining whether power transmission is possible based on a distance between the apparatus and the adjacent apparatuses or a power transmission efficiency between the apparatus and the adjacent apparatuses;

determine the operation mode of the apparatus based on the information on the operation mode of the adjacent apparatuses, in response to a determination of the power transmission being possible, where the operation mode comprises a power reception mode and a power transmission mode;

receiving power from the adjacent apparatuses in response to the apparatus being determined to operate in the power reception mode; and transmitting power to the adjacent apparatuses in response to the apparatus being determined to operate in the power transmission mode, wherein the determining comprising determining the apparatus to operate in the power reception mode, in response to all of the adjacent apparatuses operating in the power transmission mode.

15. The method of claim 14, further comprising:

receiving power, using a resonant frequency of the power reception mode; and transmitting power, using a resonant frequency of the power transmission mode, wherein the resonant frequency of the power reception mode and the resonant frequency of the power transmission mode are in different frequency bands.

16. The method of claim 14, further comprising:

determining that the apparatus is to operate in a relay mode; and receiving a relay power from a device, using a first resonant frequency; and transmitting the relay power to the adjacent apparatuses, using a second resonant frequency.

17. The method of claim 14, further comprising:

controlling an electrical pathway of the apparatus based on whether the apparatus is determined to operate in the power reception mode or the power transmission mode.

18. The method of claim 14, further comprising:

transmitting, to the adjacent apparatuses, information on an operation mode of the apparatus that is determined based on whether the apparatus is determined to operate in the power reception mode or the power transmission mode.

19. The method of claim 14, further comprising:

determining that the apparatus is to operate in the power reception mode in response to one of the adjacent apparatuses within a predetermined distance operating in the power transmission mode.

20. The apparatus of claim 1, wherein the received information on the operation mode of adjacent apparatuses verifies whether the adjacent apparatuses are in a power reception mode or a power transmission mode.

* * * * *